Figure 1:
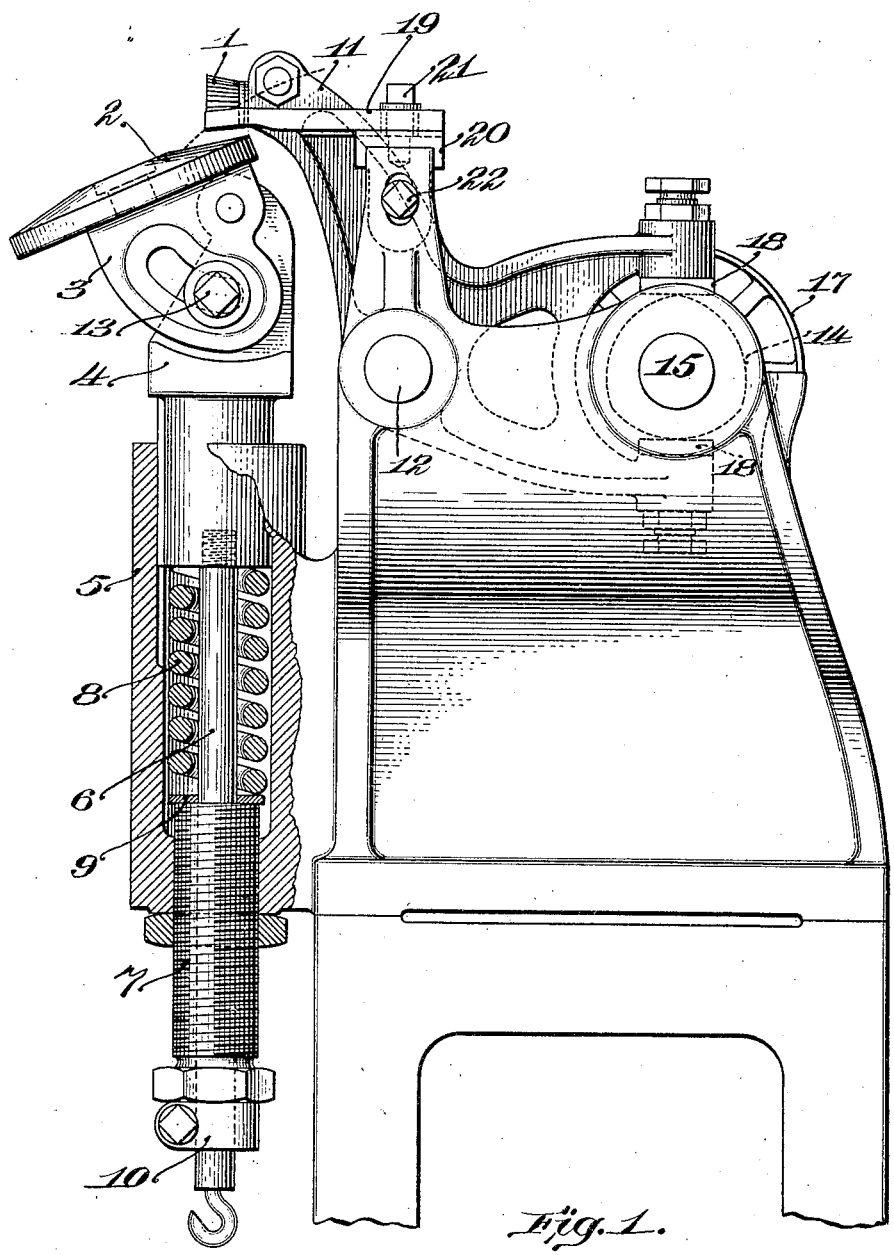

J. B. HADAWAY.
MACHINE FOR MAKING IMPRESSION OR IMITATION STITCHES.
APPLICATION FILED MAY 17, 1905.

999,161.

Patented July 25, 1911.
3 SHEETS—SHEET 1.

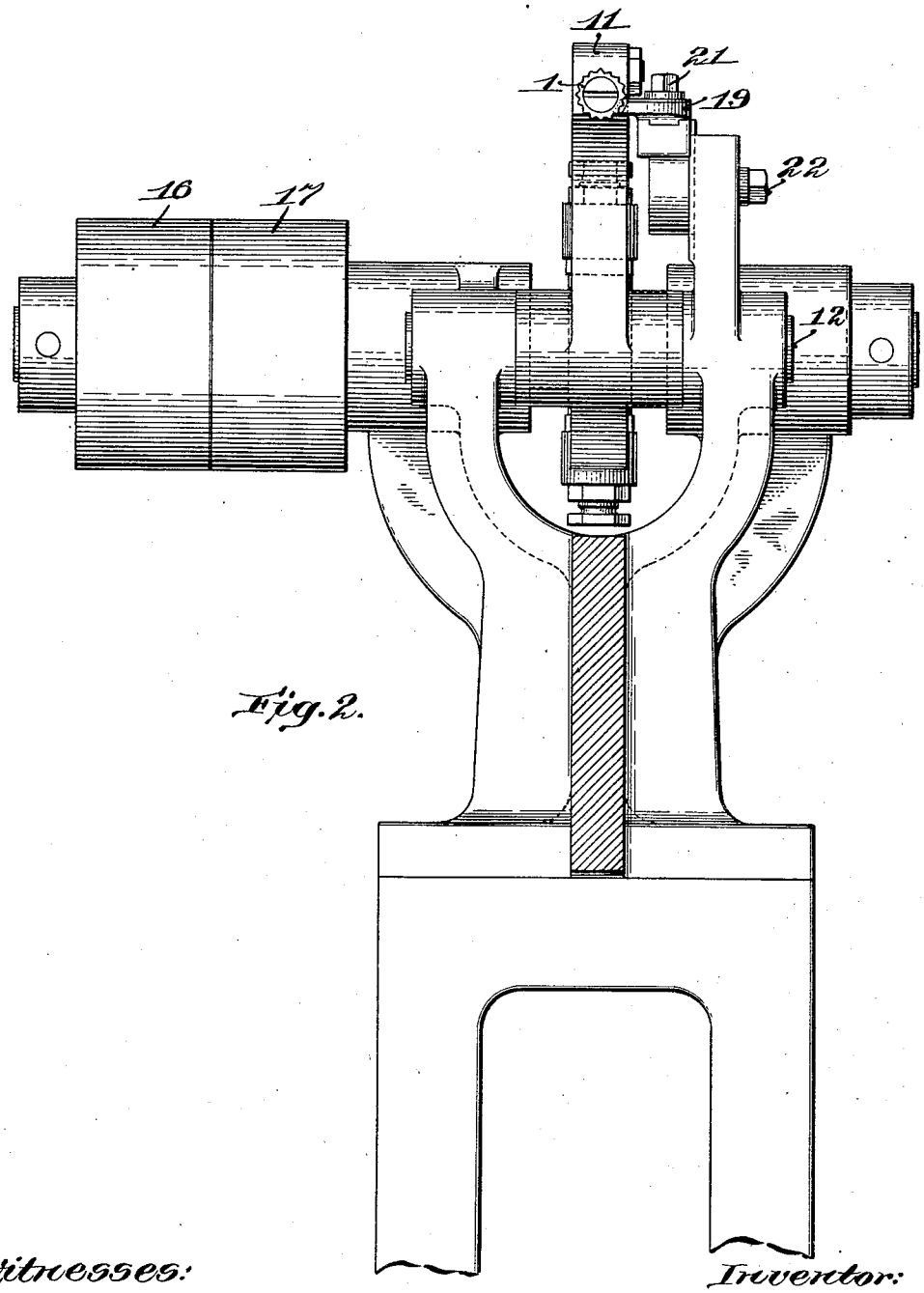

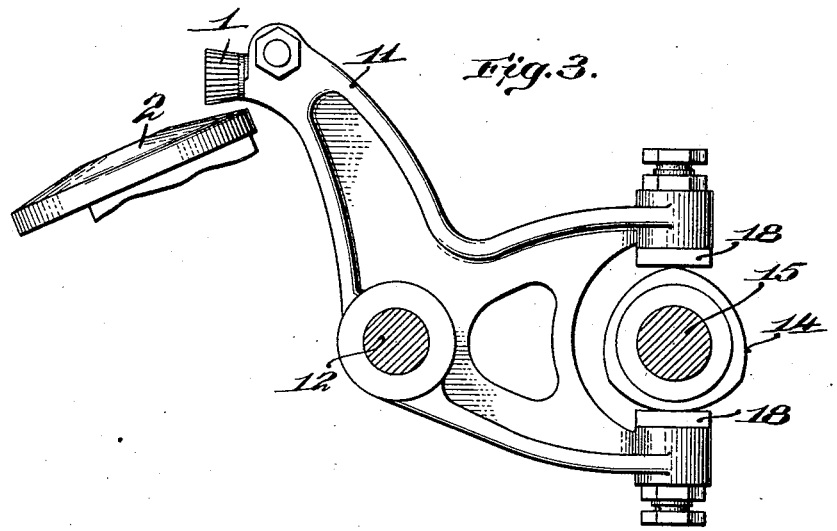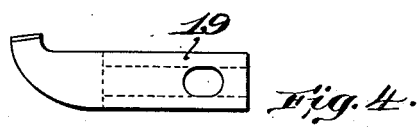

UNITED STATES PATENT OFFICE.

JOHN B. HADAWAY, OF BROCKTON, MASSACHUSETTS, ASSIGNOR TO UNITED SHOE MACHINERY COMPANY, OF PATERSON, NEW JERSEY, A CORPORATION OF NEW JERSEY.

MACHINE FOR MAKING IMPRESSION OR IMITATION STITCHES.

999,161.            Specification of Letters Patent.      Patented July 25, 1911.

Application filed May 17, 1905. Serial No. 260,849.

*To all whom it may concern:*

Be it known that I, JOHN B. HADAWAY, a citizen of the United States, residing at Brockton, in the county of Plymouth and State of Massachusetts, have invented certain new and useful Improvements in Machines for Making Impression or Imitation Stitches; and I do hereby declare the following to be a full, clear, and exact description of the invention, such as will enable others skilled in the art to which it appertains to make and use the same.

The present invention relates to machines for making impression or imitation stitches upon the upper surface of the projecting edge of a shoe sole.

Machines for making impression or imitation stitches usually comprise an indenting wheel provided with teeth shaped and spaced to produce the desired form of indentation, and the object of the present invention is to produce a machine of this class in which the indenting wheel is actuated in an improved manner so as to form clearly defined indentations corresponding in depth to the teeth of the wheel and accurately shaped crowns corresponding in shape to the grooves of the wheel.

The present invention also has for its object to provide a machine of the class referred to in which the work can be fed easily to the action of the indenting wheel without danger of marring the work.

The present invention also has for its object to provide a machine of the class referred to in which the indenting wheel is so actuated that indentations can be formed on the upper surface of the sole edge extending beneath the outwardly bulging portion of the upper without any liability of injuring the upper by the contact of the end of the wheel therewith.

With the above objects in view a feature of the present invention contemplates imparting to the indenting wheel vibrating movements in a direction to cause the wheel to move toward and from the surface of the work. By so vibrating the indenting wheel the wheel delivers a series of blows upon the work and as the work is fed past the wheel each indentation is formed by the repeated blows of a tooth of the wheel and is gradually brought to the required depth. Between successive blows the wheel is removed from contact with the work and the stock given an opportunity to return toward its original position. By repeatedly striking the work to form an indentation the stock is gradually compressed to the desired depth and its tendency to return to its original position is effectually overcome so that permanent indentations corresponding in depth to the teeth of the wheel are formed in the work. Also the material between adjacent indentations is compressed to form a permanent crown corresponding in shape to the groove between adjacent teeth of the wheel. In addition to forming clearly defined indentations and permanently shaped crowns the vibrating movement of the wheel also allows the work to be fed easily without danger of marring the surface acted upon by the tool. This is due to the fact that the wheel is removed from contact with the work between successive blows and the work can be fed forward when it is practically free from the tool. The feeding of the work is also facilitated by the fact that a comparatively light pressure is required to support the work against the action of the wheel in forming the indentations.

The vibrating movements imparted to the wheel may be of any desired extent but preferably the extent of the vibrating movements is such that the movement of the wheel in a direction perpendicular to the surface acted upon by the wheel is less than the depth of the indentations, so that a rotating movement of the wheel on its axis is insured when the work is fed past the wheel and any danger of the teeth striking upon the partially formed crowns is avoided.

The present invention contemplates vibrating the indenting wheel in any direction which will cause it to move toward and from the surface acted upon by the wheel. To allow indentations to be formed extending beneath the bulging portion of the upper without any liability of injury to the upper by the contact of the end of the indenting wheel therewith the indenting wheel is preferably vibrated toward and from the shoe upper in a direction inclined to the surface acted upon by the wheel.

The features of invention above referred to contemplate imparting a vibratory movment to the indenting wheel to cause it to move toward and from the upper surface of the projecting edge of the sole and deliver a series of blows in rapid succession upon said surface. It is believed to be new, however, and is considered to constitute a feature of the present invention to mount an indenting wheel so as to be movable toward and from the shoe upper in a direction inclined to the upper surface of the sole edge and to actuate the wheel to deliver a series of blows upon said surface, whether or not the means for actuating the wheel raises the wheel from contact with the surface acted upon.

In addition to the features of invention above referred to the present invention also contemplates the provision in a machine for making impression or imitation stitches comprising an indenting wheel which is actuated to deliver a series of blows upon the work, of upper and lower work supports constructed and arranged as hereinafter described.

The present invention also consists in certain devices, combinations and arrangements of parts hereinafter described and claimed, the advantages of which will be obvious to those skilled in the art from the following description.

The present invention will be clearly understood from an inspection of the accompanying drawings, in which—

Figure 1 is a view in side elevation, partly in section, of a machine embodying the same in its preferred form, Fig. 2 is a view in front elevation of the machine with the bracket in which the lower work support is mounted shown in section, Fig. 3 is a detail view illustrating the mechanism for actuating the indenting wheel and Fig. 4 is a detail plan view of the upper work support and guide.

1 indicates the indenting wheel, which is frusto-conical in shape and provided with peripheral teeth shaped and spaced to produce the desired form of impression or imitation stitch.

2 indicates the lower work support for engaging the bottom or tread surface of the sole of a shoe, this support being located beneath the indenting wheel in a position to support the shoe while being acted upon by the wheel. The work support is rotatably mounted upon a block 3 adjustably secured to the upper end of a vertical slide 4 mounted in a bracket 5 projecting from the front portion of the machine frame. From the lower end of the slide 4 a rod 6 projects downwardly through a threaded sleeve 7 and is connected at its lower end to a treadle (not shown) by means of which the slide 4 and the work support mounted thereon can be depressed to allow work to be inserted in the machine. The work support is pressed upwardly by means of a spring 8 coiled around the rod 6 and interposed between the lower end of the slide 4 and a washer 9 resting on the upper end of the sleeve 7. The upward movement of the slide 4 and work support when no work is in the machine is limited by a collar 10 secured to the lower end of the rod 6. By means of the screw threaded sleeve 7 the work support can be adjusted toward and from the indenting wheel so as to cause the spring 8 to press the work support against the wheel with the required pressure to produce indentations of the desired depth.

In accordance with the present invention, a vibrating movement is imparted to the indenting tool toward and from the surface of the work acted upon by the tool. In the machine illustrated in the drawings the indenting tool is mounted to rotate freely upon a stud secured in the forward end of a lever 11. The pivot of this lever is indicated at 12 and is located below the lower work support 2 so that an oscillating movement imparted to the lever moves the indenting tool toward and from the upper of the shoe supported upon the lower work support and at an angle to the upper surface of the projecting edge of the sole. The direction of the vibrating movements of the wheel is indicated by the dotted line on Fig. 1. When the indenting wheel is in its lowest position the teeth which are in contact with the work extend parallel to the surface of the work, and it will be evident that as the wheel vibrates in the direction indicated by the dotted line the teeth are removed from engagement with the work during each upward movement of the wheel. In order to allow the lower work support to be adjusted to properly support different styles of work in the proper position with relation to the indenting wheel the block 3 is pivotally mounted upon the upper end of the slide 4 and is secured to the block by means of a bolt 13 passing through an arc shaped slot in the block. The lever 11, upon which the indenting wheel is mounted, is oscillated by means of a cam 14 secured to a shaft 15 mounted in bearings in the rear portion of the machine frame and provided with fast and loose belt pulleys 16 and 17. The cam is located between two bearing blocks 18 adjustably mounted in the forked rear end of the lever 11 and is so shaped that during each revolution of the shaft 15 three complete oscillations are imparted to the lever. In actual practice the shaft 15 is rotated at a high rate of speed so that an extremely rapid vibrating movement is imparted to the indenting wheel.

In addition to the lower work support 2 the machine illustrated in the drawings is also provided with an upper work support 19 which is arranged to extend over and bear upon the surface acted upon by the indenting wheel. This upper work support is stationary and determines the position of the upper surface of the edge of the shoe sole with relation to the indenting wheel. The upper work support is arranged at one side of the indenting wheel and is preferably arranged with its outer end flush with or projecting slightly beyond the end of the indenting wheel so as to form a guide against which the shoe upper bears as the work is fed through the machine. The distance to which the indentations formed on the upper surface of the sole edge extend beneath the projecting portion of the upper depends on the position of the outer end of the work support with relation to the end of the indenting wheel, and in order that this distance may be varied as desired the upper work support is mounted in a block 20 so as to be capable of an inward and outward adjustment and is secured by means of a bolt 21 passing through an elongated slot in the support. To provide for a vertical adjustment of the upper work support toward and from the lower work support to vary the depth of the indentations or to bring the lower surface of the upper work support into the proper position with relation to different indenting wheels the block 20 is vertically adjustable upon the frame of the machine and is secured thereto by means of a bolt 22 passing through an elongated slot in the machine frame.

In the operation of the machine the lower work support is first depressed and the shoe placed in position with the bottom of the sole resting on the lower work support and the edge of the sole projecting beneath the upper work support. The lower work support is then allowed to rise and the upper surface of the sole edge is pressed against the lower surface of the upper work support. The indenting wheel vibrates rapidly in the direction indicated by the dotted line in Fig. 1 and as the shoe is fed past the tool each tooth of the wheel delivers a series of blows upon the work and the stock is gradually compressed to form permanent indentations corresponding in depth to the teeth of the wheel and permanent crowns between the indentations corresponding in shape to the grooves in the wheel. The movements of the indenting wheel perpendicular to the surface being acted upon are less than the depth of the indentations formed in the work so that the wheel is rotated on its axis as the work is fed and the teeth remain in engagement with the partially formed indentations. A comparatively light pressure is required to support the work against the thrust of the indenting wheel, so that the work is easily fed past the wheel. The work support is slightly depressed by the action of the wheel and on account of the rapid vibration of the wheel remains in its depressed position while the wheel is raised from the work, so that while the work is being fed it is either out of engagement with the lower surface of the upper work support or is pressed so lightly against this surface as not to interfere with the feeding of the work. During each upward movement of the indenting wheel it moves away from the shoe upper and thus the work can be fed without any liability of injury to the upper by contact with the end of the wheel and the indenting wheel caused to form indentations extending beneath the bulging portion of the upper.

The nature and scope of the present invention having been indicated and a machine embodying the invention in its preferred form having been specifically described, what is claimed is:—

1. A machine for making impression or imitation stitches, having, in combination, a work support arranged to engage the bottom of the sole of a shoe, an indenting wheel arranged to act upon the upper surface of the projecting edge of the sole and means for vibrating the indenting wheel in a direction to cause it to move toward and from the surface acted upon by the wheel and deliver a series of blows in rapid succession upon said surface whereby each indentation is formed by the repeated blows of a tooth of the wheel.

2. A machine for making impression or imitation stitches, having, in combination, a work support arranged to engage the bottom of the sole of a shoe, an indenting wheel arranged to act upon the upper surface of the projecting edge of the sole and means for vibrating the indenting wheel to cause it to move toward and from the shoe upper in a direction inclined to the surface acted upon by the wheel and deliver a series of blows in rapid succession upon said surface whereby each indentation is formed by the repeated blows of a tooth of the wheel.

3. A machine for making impression or imitation stitches, having, in combination, a work support arranged to engage the bottom of the sole of a shoe, an indenting wheel arranged to act upon the upper surface of the projecting edge of the sole, and means for imparting to the wheel vibrating movements toward and from the surface acted upon by the wheel, the movements of the wheel in a direction perpendicular to said surface being less than the depth of the indentations made by the wheel.

4. A machine for making impression or imitation stitches, having, in combination, a work support arranged to engage the bottom of the sole of a shoe, an indenting wheel arranged to act upon the upper surface of the projecting edge of the sole, and means for imparting to the wheel vibrating movements toward and from the shoe upper in a direction inclined to the surface acted upon by the wheel, the movements of the wheel in a direction perpendicular to said surface being less than the depth of the indentations made by the wheel.

5. A machine for making impression or imitation stitches, having, in combination, a work support arranged to engage the bottom of the sole of a shoe, an indenting wheel mounted to move toward and from the shoe upper in a direction inclined to the upper surface of the projecting edge of the sole and means for actuating the wheel to deliver a series of blows in rapid succession upon said surface whereby each indentation is formed by the repeated blows of a tooth of the wheel.

6. A machine for making impression or imitation stitches, having, in combination, a yieldingly mounted work support to engage the bottom of the sole of a shoe, an upper work support to engage the upper surface of the projecting edge of the sole, an indenting wheel movable with relation to the upper work support toward and from the work and means for actuating the indenting wheel to deliver a series of blows in rapid succession upon said surface.

7. A machine for making impression or imitation stitches, having, in combination, a yieldingly mounted work support to engage the bottom of the sole of a shoe, an upper work support to engage the upper surface of the projecting edge of the sole, an indenting wheel mounted to move with relation to the upper work support toward and from the shoe upper in a direction inclined to said surface, and means for actuating the wheel to deliver a series of blows in rapid succession upon said surface.

8. A machine for making impression or imitation stitches, having, in combination, a yieldingly mounted lower work support to engage the bottom of the sole of a shoe, an upper work support and guide to engage the upper surface of the projecting edge of the sole, said upper work support and guide being adjustable inwardly and outwardly and also toward and from the lower work support, an indenting wheel, and means for actuating the indenting wheel to deliver a series of blows in rapid succession upon said surface.

9. A machine for making impression or imitation stitches, having, in combination, a yieldingly mounted work support to engage the bottom of the sole of the shoe, an indenting wheel mounted to move toward and from the shoe upper in a direction inclined to the upper surface of the projecting edge of the sole, and means for actuating the wheel to cause each tooth of the wheel to deliver a series of blows in rapid succession upon said surface and form an indentation.

10. A machine for making impression or imitation stitches, having, in combination, a yieldingly mounted work support to engage the bottom of the sole of a shoe, an indenting wheel arranged to act upon the upper surface of the projecting edge of the sole, and means for moving the indenting wheel toward and from said surface to cause each tooth of the wheel to deliver a series of blows in rapid succession upon said surface and form an indentation.

In testimony whereof I affix my signature, in presence of two witnesses.

JOHN B. HADAWAY.

Witnesses:
FRED O. FISH,
ALFRED H. HILDRETH.

---

Copies of this patent may be obtained for five cents each, by addressing the "Commissioner of Patents, Washington, D. C."